(12) United States Patent
Ehrman

(10) Patent No.: US 11,796,213 B2
(45) Date of Patent: Oct. 24, 2023

(54) INTEGRATED ENERGY RECOVERY BASE OR ROOF-CURB FOR AIR-CONDITIONING UNIT

(71) Applicant: Stephen G Ehrman, Indianapolis, IN (US)

(72) Inventor: Stephen G Ehrman, Indianapolis, IN (US)

(*) Notice: Subject to any disclaimer, the term of this patent is extended or adjusted under 35 U.S.C. 154(b) by 278 days.

(21) Appl. No.: 17/098,397

(22) Filed: Nov. 15, 2020

(65) Prior Publication Data

US 2021/0148598 A1 May 20, 2021

Related U.S. Application Data

(60) Provisional application No. 62/936,529, filed on Nov. 17, 2019.

(51) Int. Cl.
*F24F 12/00* (2006.01)

(52) U.S. Cl.
CPC .................. *F24F 12/006* (2013.01)

(58) Field of Classification Search
CPC ...................................... F24F 12/006
USPC ........................................................ 165/252
See application file for complete search history.

(56) References Cited

U.S. PATENT DOCUMENTS

| | | | |
|---|---|---|---|
| 4,224,422 A * | 9/1980 | Rude | C08F 299/06 525/73 |
| 4,377,201 A * | 3/1983 | Kruse | F24F 12/006 165/909 |
| 5,024,263 A * | 6/1991 | Laine | F24F 11/81 165/283 |
| 5,179,998 A * | 1/1993 | Des Champs | F24F 3/14 62/93 |
| 5,372,182 A * | 12/1994 | Gore | F24F 1/0323 165/137 |
| 2005/0103464 A1* | 5/2005 | Taylor | F24F 12/006 165/4 |
| 2009/0114369 A1* | 5/2009 | Kammerzell | F28D 9/0037 165/47 |
| 2012/0196523 A1* | 8/2012 | Jiang | F28D 9/0037 454/237 |
| 2014/0190656 A1* | 7/2014 | Heberer | F28D 21/0001 165/4 |
| 2019/0063780 A1* | 2/2019 | Puttagunta | F24F 11/0001 |

* cited by examiner

*Primary Examiner* — Justin M Jonaitis
(74) *Attorney, Agent, or Firm* — Lambert Shortell & Connaughton; David J. Connaughton, Jr.; Justin P. Tinger

(57) ABSTRACT

An energy recovery system used with HVAC and Air-Conditioning units that is incorporated into a roof-curb, final filter curb assembly or base support structure (roof-curb air plenum) commonly used with mass produced standard or semi-custom manufactured air conditioning systems. The arrangement includes core or wheel type energy recovery media arranged and affixed within the curb or support base in an orientation and method to maximize the amount of energy recovery surface area installed in a minimum area while still allowing good airflow practices. Other items included may be filter racks preceding where air enters the energy recovery cores, a singular or multiple fan(s) to move the air, a condensate drain pan, and a preheat coil or bypass dampers which operate to prevent frosting of the energy recovery surface areas in cold conditions. A direct digital controller may also be included to maximize efficiency and control.

1 Claim, 9 Drawing Sheets

INTEGRATED ENERGY RECOVERY BASE OR ROOF-CURB FOR AIR-CONDITIONING UNIT

CROSS-REFERENCE TO RELATED APPLICATIONS

U.S. Provisional Application No. 62/936,529

STATEMENT REGARDING FEDERALLY SPONSORED RESEARCH OR DEVELOPMENT

None

REFERENCE TO SEQUENCE LISTING, A TABLE, MICROFICHE OR A COMPUTER PROGRAM LISTING COMPACT DISK APPENDIX

None

BACKGROUND OF INVENTION

Field of the Invention

The present invention is within the technical field of heating, ventilating and air conditioning systems (HVAC). More particularly, the invention pertains to ventilating spaces using outside air and pretreating the outside air with energy recovery devices.

Description of the Related Art

Introducing outside ventilation air into buildings and indoor spaces such as laboratories, highly sensitive manufacturing spaces, electronics production rooms, surgery suites, classrooms, and the like provides many benefits including increasingly recognized health benefits to humans. Ventilating spaces with outside air displaces the stale indoor air and introduces fresh air. Ventilating rates are substantial for laboratories, manufacturing, surgery suits and similar specialty areas because of the goal of purging the contaminants that are a byproduct of a process in the space. Research continues to accentuate the need for greater outside air to be introduced into spaces as greater numbers of illness, mental incognizance, and deaths are attributed to bad indoor air quality which may be a result of the process of manufacturing chemicals, use of chemicals in factories and laboratories, carcinogen build up in living spaces such as firehouses, and naturally occurring gases such as radon and methane trapped within houses and living spaces. However, conditioning the outside air in order to be introduced into a building is a costly proposition due to requiring a custom design and expensive to operate HVAC unit. To mitigate these costs, energy recovery media is used in HVAC units or systems to save energy and operating costs by pre-treating the incoming fresh outside air. Thus, energy recovery media, and more particularly, air to air heat exchangers, are used increasingly to ventilate and also control building pressurization by extracting energy from the exhausted air and pretreating the entering outside air. Most recently, energy recovery in air to air outside air systems have become constructed, and more widely applied, what is known as static plates or cores. This new media design and material allows for efficient energy transfer with the important benefit of minimizing or eliminating cross contamination of the dirty exhaust air to the clean outside air, thereby allowing application of the energy recovery in many more applications than other technologies. However, these cores take a lot of space and are difficult to incorporate into HVAC units and interior spaces, and more particularly, into less expensive mass-produced HVAC units. The manufacturers that do offer core type ERVs designed in the unit are limited, specialized and expensive. Additionally, there are standalone plate type energy recovery cores made to be mounted in the ductwork of an HVAC system requiring ducting, interconnection and installation in the field into a building HVAC system. Additionally, some manufacturers offer packaged energy recovery units housing the energy recovery cores and providing fans to move the air thru the system so it can be incorporated into an HVAC system.

These separate arrangements unfortunately require a large amount of field labor and material to interconnect the energy recovery system to the main system air-conditioning unit (RTU) or integrate to the HVAC system. Attempts to offer incorporated core or plate ERVs into a custom HVAC unit requires additional unit length and added first cost. Thus, these offerings fall short of energy recovery being utilized in many applications because of cost, time of manufacture and added length requirements to HVAC units and systems. Therefore, there exists a need for incorporating the core or plate type energy recovery in unique spaces that are otherwise wasted in HVAC systems, such as integrated into the supporting base, roof-curb or final filter roof-curb and having additional features that it may be used with a standard mass produced hvac unit.

SUMMARY OF INVENTION

Brief Summary of the Invention

The present invention provides incorporating desirable energy recovery cores or plates into an already necessary component to the HVAC system, a roof curb, ground mounted base, transition air plenum, final air filter or other type base (herein referred to as 'roof-curb or base air plenum'). The present invention provides that the roof-curb or base air plenum be designed and constructed to house the energy recovery cores so that an HVAC unit can be placed on top, as it usually would be supported, and operate without specialty designs, custom engineering costs, additional factory coordination, or modifying ductwork or other interconnections in the field so that energy recovery be provided and large amounts of outside air be introduced into the system.

In one embodiment of the present invention, energy recovery cores are incorporated into a roof-curb or base air plenum. Air paths are created so that the air is directed in flow that the energy from the space exhaust air is used to pretreat the incoming outside air and moved into the building with typical hvac system fans.

In a second embodiment of the present invention, the airflow is moved with fans incorporated into the curb only, or may be moved also using one or multitude of fans that may be in the new HVAC unit or building.

In a third embodiment of the present invention, the energy recovery cores or plates are arranged so the outside air moves thru the energy recovery core, proceeds thru the HVAC unit, then again thru the energy recovery core so that the air is reheated to a room-neutral temperature before discharging into the space. This arrangement does not recovery any energy from room exhausted air rather uses the energy from the outside air to final condition air leaving the hvac unit.

DETAILED DESCRIPTION OF THE INVENTION

Figure 1:
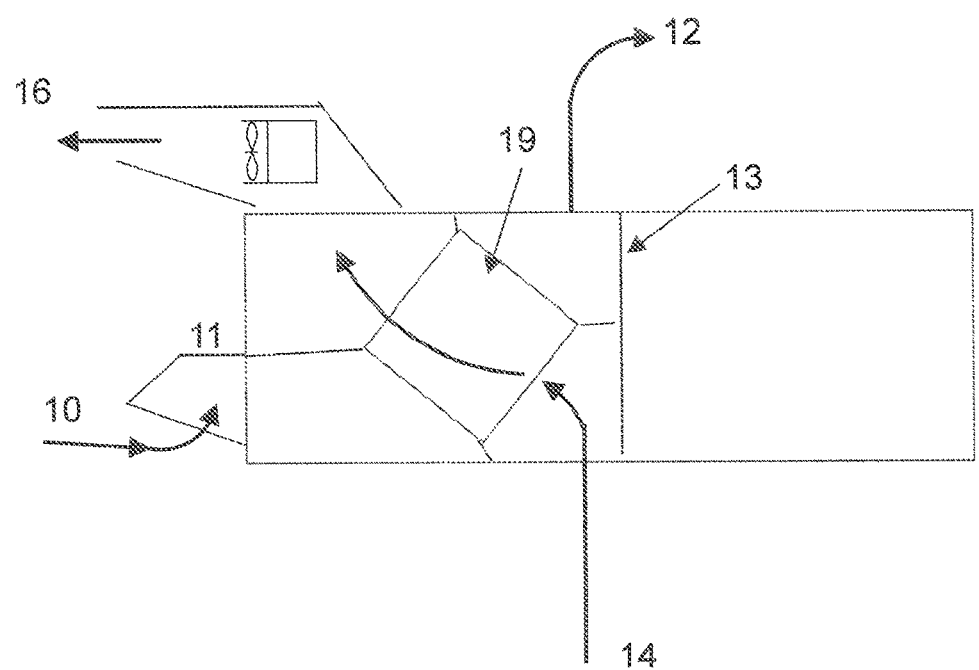
FIG. 1 is a perspective view of the present invention showing the main components.

Referring now to the invention in more detail, FIG. 1 shows the present invention with preferred embodiments of an energy recovery core 19 mounted within the roof-curb or base air plenum or other type of base support where the air condition system or hvac unit is positioned and mounted on top. The energy recovery cores are attached to the sidewalls and floor of the support housing, while additional attachments 13 also serve as a means of necessarily separating airflow chambers. Lines with arrows are used to show the direction of air flows and the energy recovery process. 10 represents outside air entering the present invention thru an opening 11 proceeding thru the energy recovery core 19 where it receives the benefit of recovered energy, stored or otherwise transferred within the energy recovery core, before entering an hvac unit 12 that is installed on top the base, roof-curb or base air plenum. Stale air 14 from a building or space is returned to the present invention thru an opening in the roof-curb or base air plenum and enters the energy recovery core to transfer its energy and proceeding either thru an exhaust fan mounted in the side wall of the invention 16 and discharging to be expelled outside. Alternatively or in addition to existing thru the fan mounted in the present invention 16, the air may all or in part, exit from the energy recovery core into the air conditioning unit mounted on top and either exhausted thru relief openings or exhaust fans that are installed in the hvac unit, and may additionally in part, return back into the hvac units process stream.

Figure 2:
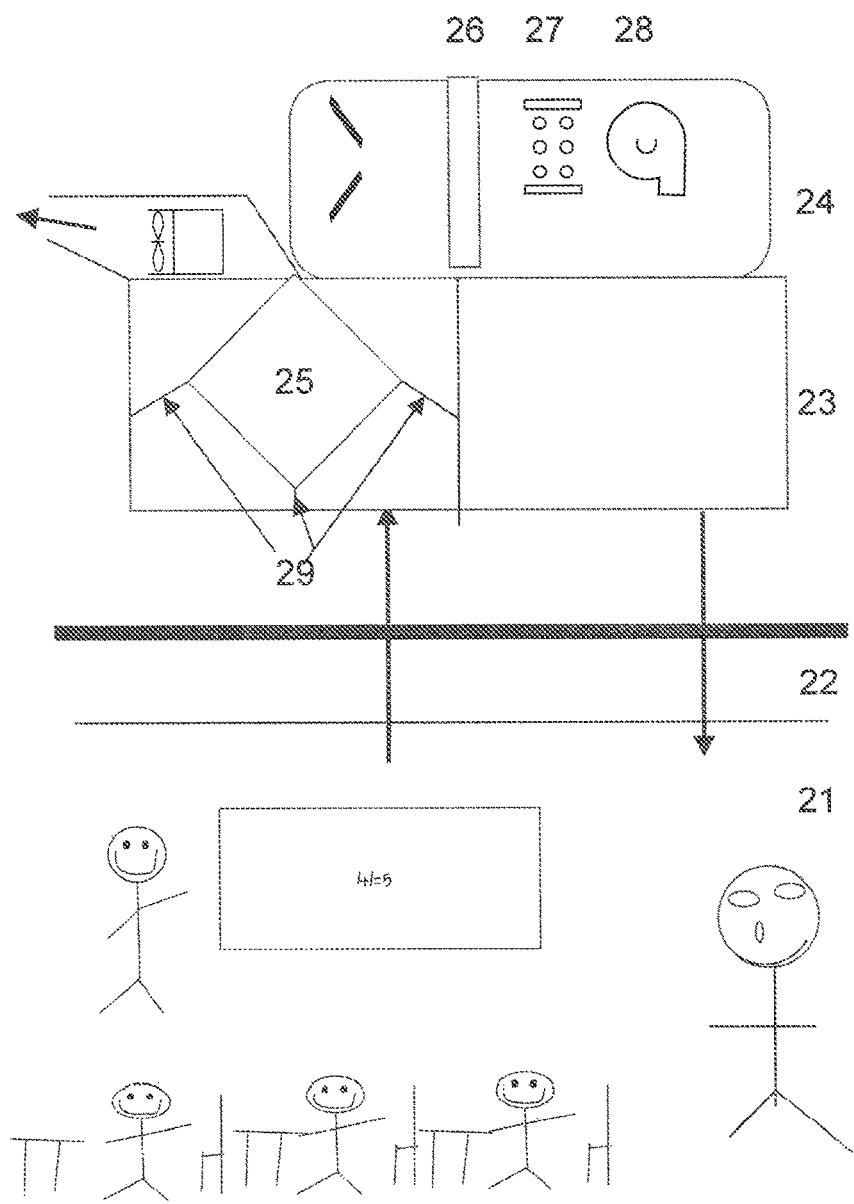
FIG. 2 is a perspective view of the present invention as a roof curb or support base plenum and the relationship of a building space.

FIG. 2 is an overall perspective view showing a typical application using the present invention with a hvac unit mounted on top of it, such as a commercial office building, laboratory, surgery suite, school, assembly or the like where people or process is located inside which can benefit from outside air ventilation air or positive pressurization 21. The room air is exhausted thru the ceiling interstitial space 22 and proceeds thru the energy recovery core 25 and then is exhausted as previously shown. The outside air is shown entering the energy recovery core 25, proceeding thru a typical hvac unit 24 beginning with an air filter 26, further passing thru a heating/cooling/reheat coil 27, a fan 28, and other thermodynamic applications such are heating, reheat or humidification and the like, then exiting the hvac unit thru the present invention and entering the space 21 as conditioned air. The present invention includes a necessary divider 29 located within the present invention so that the return air being expelled does not mix with the supply air, thus separating fresh incoming air from stale exhausting air.

Figure 3:
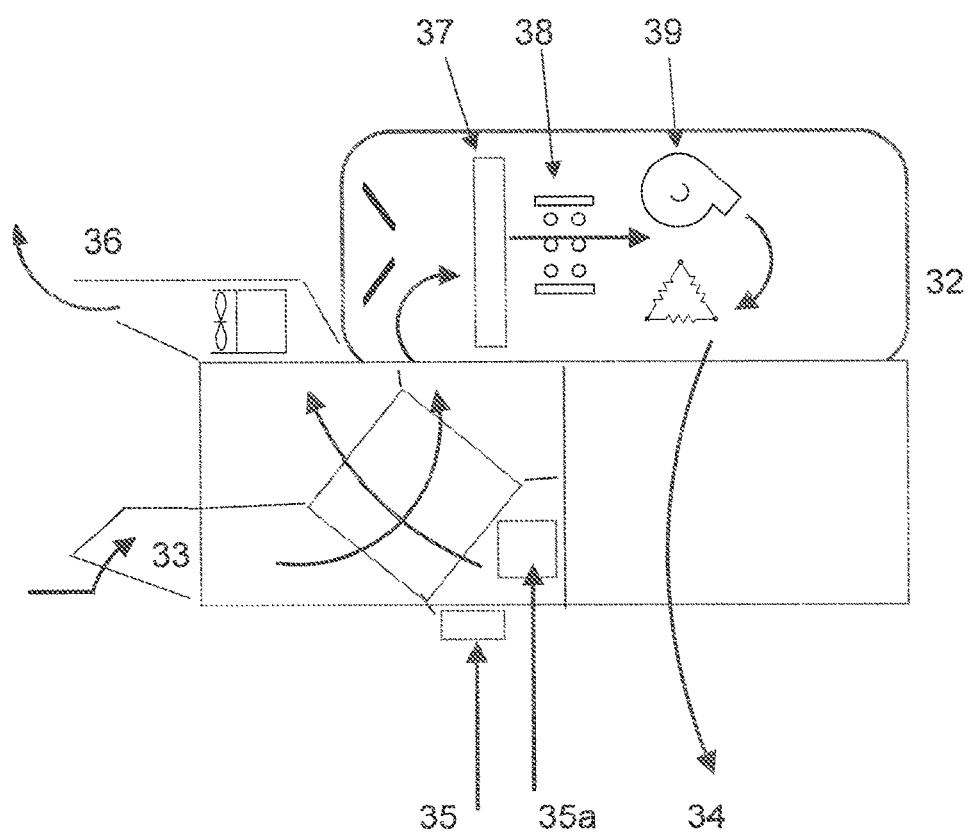
FIG. 3 is a perspective view of the roof curb or support base showing just an energy recovery core.

FIG. 3 shows an isolated view of the present invention configured as a supporting base mounted on the ground, or on a roof. The outside air is shown entering the energy recovery core thru an opening 33, thru the energy recovery core, and proceeding thru a typical hvac unit thru items such as a filter 37 then a heating/cooling/reheat coil 38 then thru a fan 39 and may proceed thru other post fan treatment s such are heating or reheat, humidification and the like, then existing the hvac unit thru an opening in the present invention and leaving the unit thru an opening 34 as conditioned air, as previously shown. The space stale air return connections may be configured so that the air can enter the invention from an opening 35 in the bottom of the of the invention where on a roof, or thru the side opening of the invention where ground mounted 35a, or a combination of both. These 35 and 35a are typical duct type connections.

Figure 4:
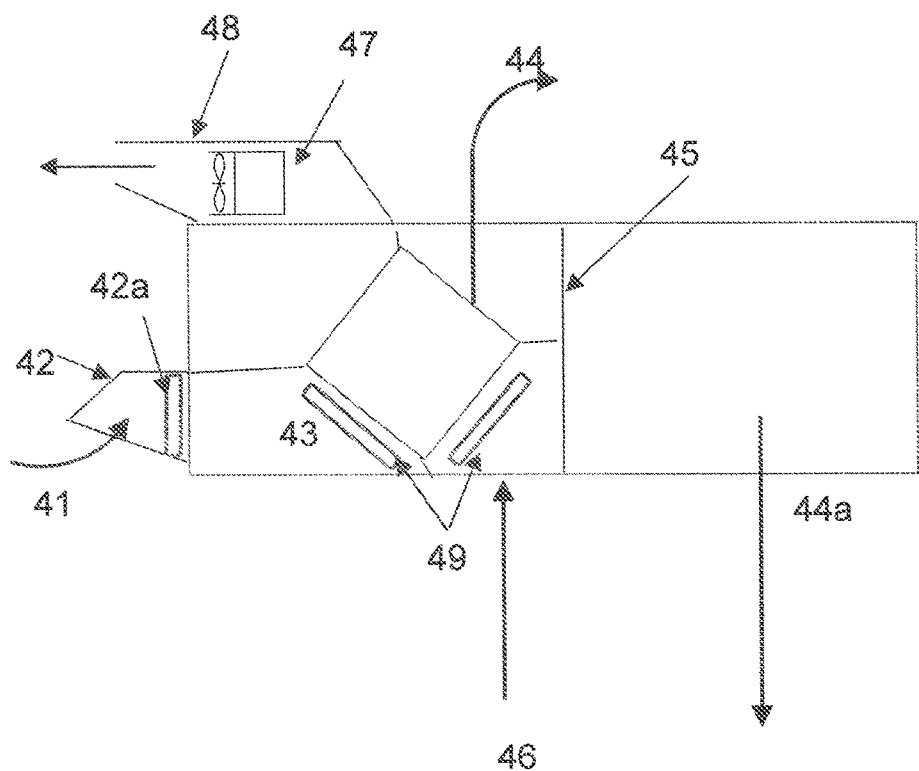
FIG. 4 is a perspective view of the present invention detailing main components and additional optional accessories.

FIG. 4 shows an isolated view of the present invention further highlighting details and possible accessories. A traditional air intake hood 42 may be included which reduces rain and moisture that may otherwise undesirably be carried in the outside airstream 41 to the inside of the of the interior housing of the invention. Additionally, mesh filters 42a can be included to reduce lint, bugs and mist-moisture in outside air from entering the housing as shown in the cross-hatched rectangle of the incoming air path. Similarly, an exhaust hood 48 may be employed to ensure rain and other contaminates are more restricted from undesirably entering the housing, shown to encompass the exhaust fan 47. The invention may also include filter tracks to hold simple standard or custom sized air filters 49 on the inlet side 43 of the energy recovery core so that the core is protected from dirt that is carried in the air. One arrangement of air-stream separation dividers and support structures 45 are shown that also serve to isolate the supply air to the room 44a from the stale air 46 being exhausted from the building or room.

Figure 5:
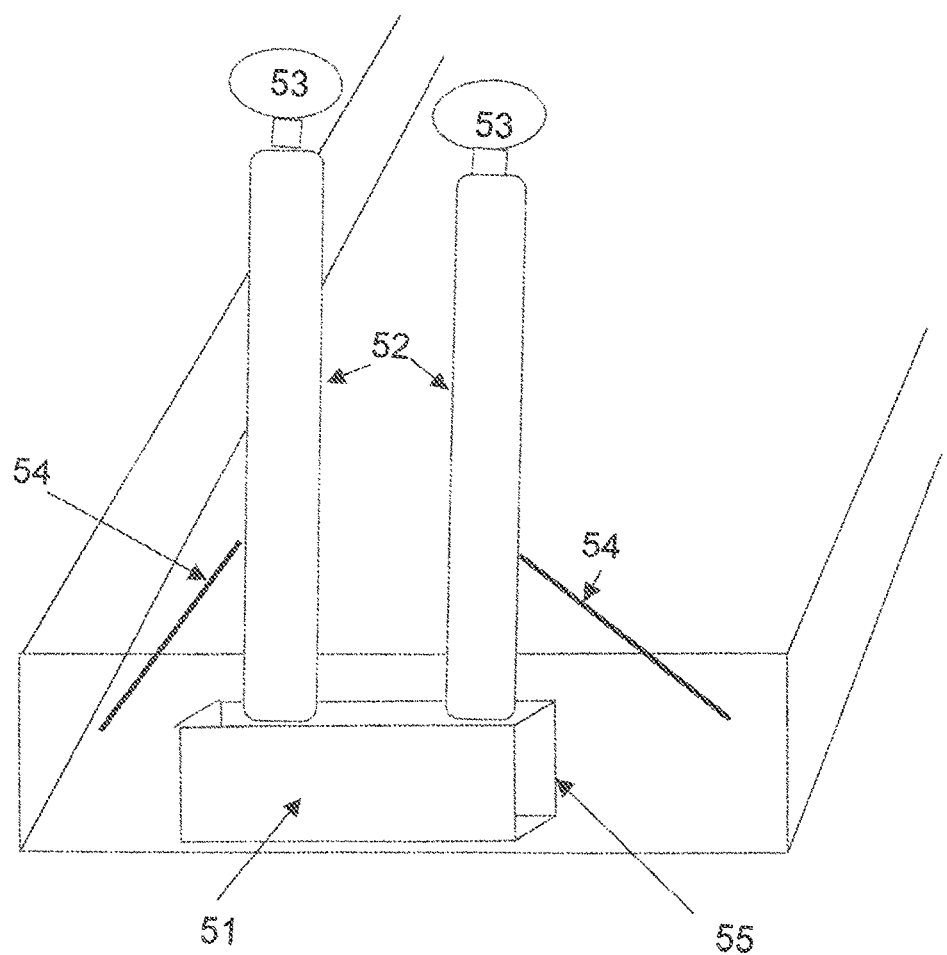
FIG. 5 is a perspective view of the present invention also containing an alternate air intake hood.

FIG. 5 shows the present invention with an alternative intake air attachment 51. The assembly is attached, bolted, welded 55 or otherwise affixed and supported 54 to the present invention and encloses the area of the outside air intake. The attachment raises the effective height of air intake through the enclosed duct 52 to a higher level off the roof or ground and is open to take in outside air thru a traditional weatherproof mushroom 53 or side mounted hood. Alternatively, the duct 52 could be one or several round ducts, if the application is better suited for such use.

Figure 6:
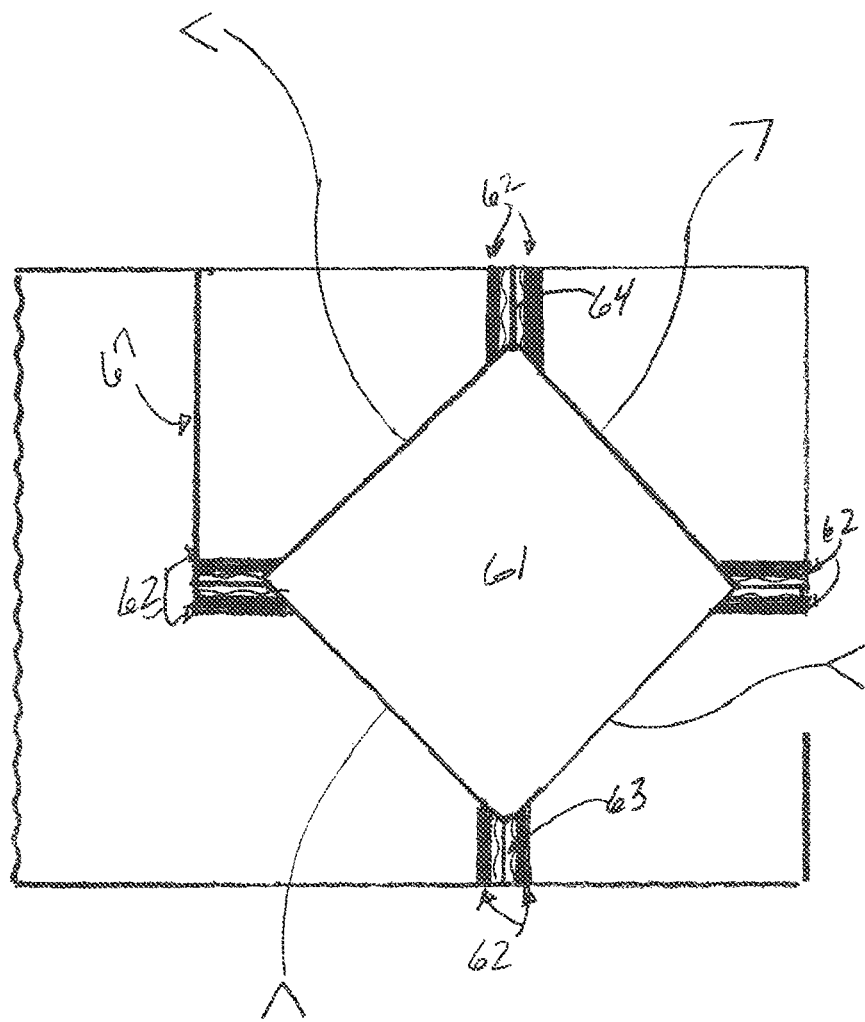
FIG. 6 is an exploded view of the present invention's main component and support and mounting assembly.
Figure 6:
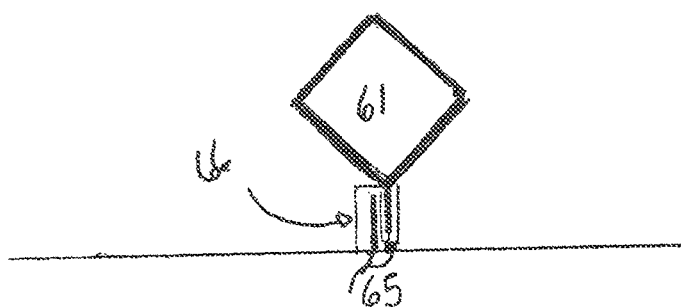

FIG. 6 shows an exploded view of part of the present invention detailing the preferred embodiment and alternative methods of attaching the energy recovery core to the surfaces of the base plenum. The energy recovery core 61 may have attachment tabs 63 connected at a perpendicular angle to the curb or base plenum. These tabs can be a singular continuous assembly across the entire width of the frame of the energy recovery core or may be smaller in length than the total width and of a plural arrangement where two or more such arrangements are located along the width of the frame. These tabs attached to the core 63 will thus support the core 61 in position by sliding into two other tabs 62 which are attached perpendicularly to the supporting cabinet or to another supporting member such as the air divider 67. Alternatively, these supports 62 may also be constructed of what is commonly referred to as a U-channel steel support. Attached to the supporting tabs, or U channel, is a foam or fabric 64 which ensures an air tight fit and helps to reduce any airflow leak. An alternative method of attachment is also shown where there is a singular tab 65 attached to both the energy recovery core and the plenum frame. The two tabs are then joined and secured by a mechanism 66 that holds the two tabs together, commonly called an S clip. Similarly, foam or fabric is in place between the tabs to help air from leaking or bypassing thru the seal. The supports 63 and 65 may be attached on the corners of the core, or at other places on the frame as best dictated for the particular installation. This is sometimes referred to as mechanical seals or mechanical supports in the art.

Figure 7:
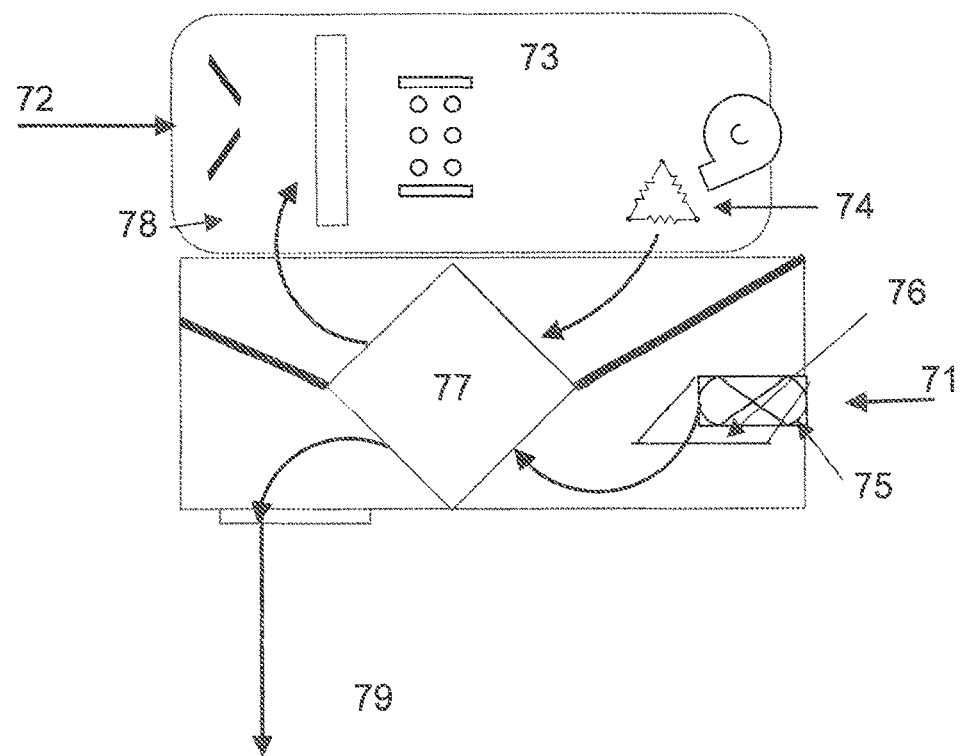
FIG. 7 is a perspective view of the present invention, detailing an alternate airflow path.

FIG. 7 shows an alternate arrangement of the present invention where the airflow is such that the energy recovery core 77 acts as a way to reheat supply air which is desirable in some applications. In this arrangement, the position of the energy recovery core is shifted from the preferred arrangement so that outside air enters thru an opening in the side of the plenum wall 76 and may be boosted in pressure or controlled in pressure with a fan 75 located in the same opening, with the air proceeding thru the energy recovery core 77 where the outside air is pretreated with conditioned air that is leaving the typical HVAC unit mounted on top 73. The air 78 then proceeds thru the typical HVAC unit, it may be mixed with other untreated outside air 72, then proceeding thru the typical process of heating, cooling, and reheat, then thru the fan, and final process 74 of heat or humidification, then thru the core 77 where it is warmed or cooled by the energy given up from the outside air 76 that was introduced into the core 77. The treated and conditioned air then enters into the space.

Figure 8:
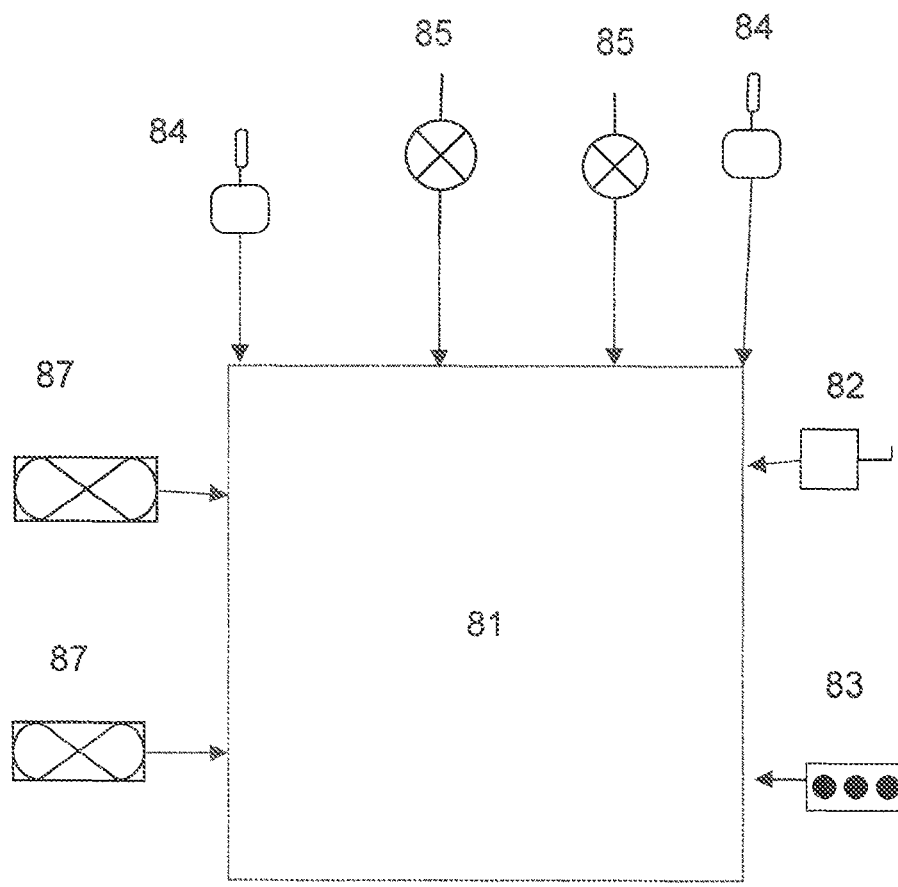
FIG. 8 is a graphical view of a DDC controller used in the present invention

FIG. 8 shows a control system with a central processing unit that may be included to control and sequence the present invention in more complex applications. The system can first be enabled or turned on 82 by a switch, remote contact, time clock or other interface. The system may monitor airflow of the outside air being introduced with a typical device such as velocity probes or thermal measuring devices 83 that are mounted within the outside air stream Additionally the same type device may be mounted on the exhaust fan to determine the amount of air being exhausted, or in any location on the present invention that makes logical sense needed to obtain airflow data. The control system may sense environmental pressures of air and the conditioning space in order to follow a typical sequence of pressuring spaces, within a building, or deliver different amount of air to provide pressures in the space using typical pressure differential sensors 84. An electric heating coil arranged to preheat the entering outside air to the energy recovery core, bypass damper around the energy recovery core, or engage some other frost prevention, may be included and controlled in order to reduce, minimize or eliminate frost forming on the entering surface the energy recovery core when the dew point temperature approaches the outside air temperature which may cause frost on the exiting air. Defrost mode may be accomplished by engaging a preheat coil, only exhausting air to warm the core, or bypassing the core, or other means. The control system temperature or humidity measurements, thru devices 85 that are mounted on applicable airstreams, are used to determine the defrost mode needed and also may be used to operate in a typical economizer mode allowing the outside air to bypass the energy core. The CPU may include outputs 87 which control the speed and volume of the fans in order to accomplish the most energy efficient sequences described above, control the building pressurization or used for initial set up, air balancing and testing.

Figure 9:
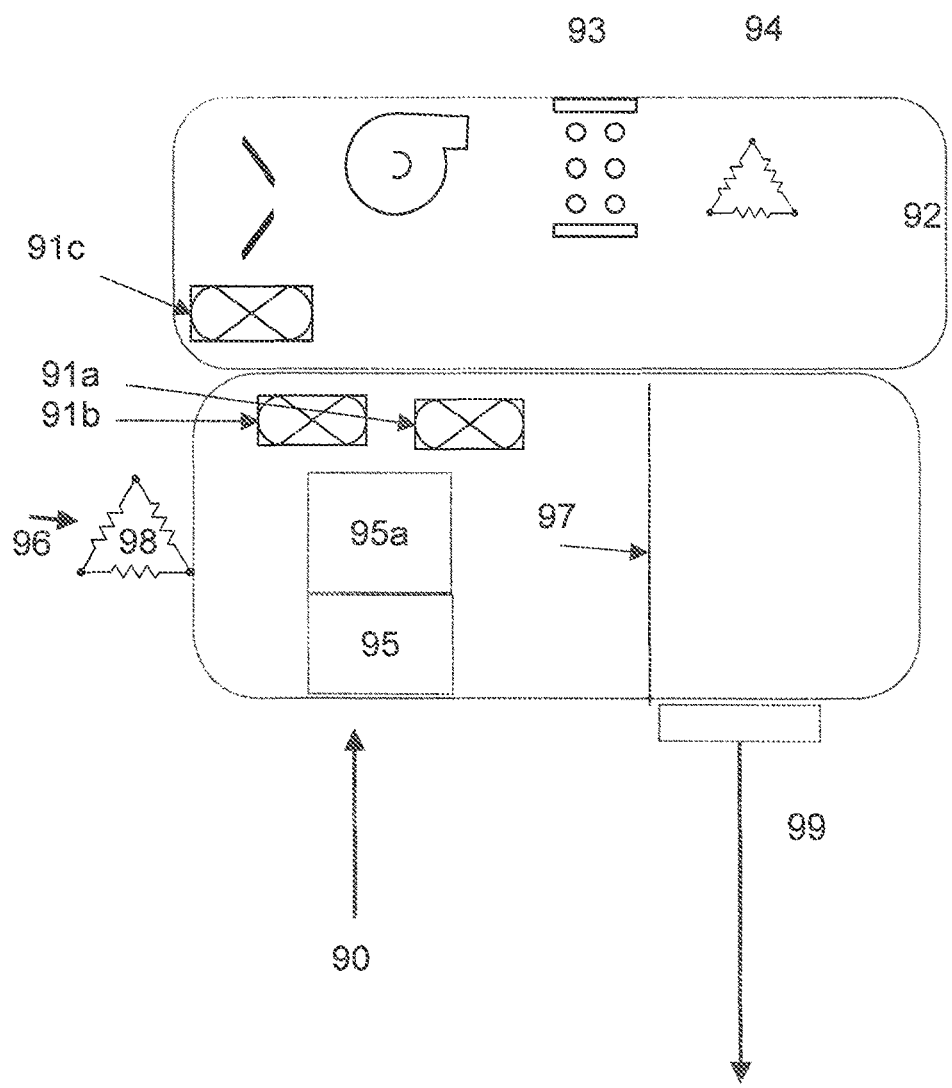
FIG. 9 is a perspective view of present invention showing alternate arrangements and accessories

FIG. 9 shows the present invention housing an energy core 95 mounted within the air plenum curb or base such that the core is rotated approximately 45 degrees from the preferred position. In this arrangement the stale space return air enters thru the bottom of the base 90 and proceeds thru a core 95 or multiple stacked cores 95a then exhaust out thru an exhaust fan 91a, multiple fans 91b, or thru the hvac unit mounted exhaust fan 91c. The fresh outside air 96 enters into an energy recovery core 95 or multiple stacked core 95a, and proceeds into the hvac unit fan 92 then the typical cooling 93 and heating process 94 then thru the invention opening which is separated from the pretreated airflow with a divider 97, and into the space 99. Additional features in this embodiment or the preferred embodiment, may include a preheating element or coil 98 to add heat to the air to help minimize frost forming on the energy recovery core when temperatures and dewpoints become low enough that support conditions to frost. Additional arrangements may also include multiple cores in parallel or series in either this arrangement or the preferred arrangement in order to increase efficiency or desire certain thermodynamic results.

I claim:
1. An energy recovery device comprising:
an HVAC unit positioned and mounted on a top of a support housing, the support housing defining an airtight plenum;
an energy recovery core mounted within the airtight plenum, the energy recovery core operable to transfer heat and moisture between a flow of outside air and a flow of exhaust air;
a divider within the airtight plenum separating the airtight plenum into a first side containing the energy recovery core, and a second open side isolated from the first side;
wherein the energy recovery core is mounted to the airtight plenum walls and to the divider by a plurality of attachment tabs on four sides of the energy recovery core, each of the plurality of attachment tabs comprising a foam or fabric;
the connection of the energy recovery core to the plenum walls and divider defining four isolated sections to receive air flows across the energy recovery core;
the airtight plenum defining a first opening in communication with a first of the four isolated sections to receive an outside air flow, outside air flow proceeds through the energy recovery core to a second of the four isolated sections which exits the airtight plenum through a second opening directly to the HVAC unit; the airtight plenum defines a third opening in communication with a third of the four isolated sections, stale air from a building or space returns through the third opening and passes through the energy recovery core to a fourth section of the four isolated sections and exits the airtight plenum through a fourth opening in communication with the fourth section of the four isolated sections.

* * * * *